(No Model.)
E. W. RICE, Jr.
METHOD OF SYNCHRONIZING ALTERNATE CURRENT MACHINES.
No. 430,320. Patented June 17, 1890.
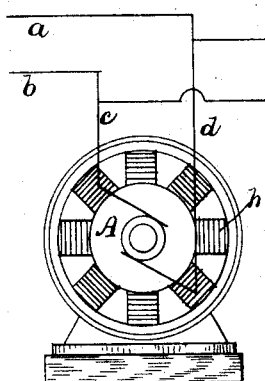
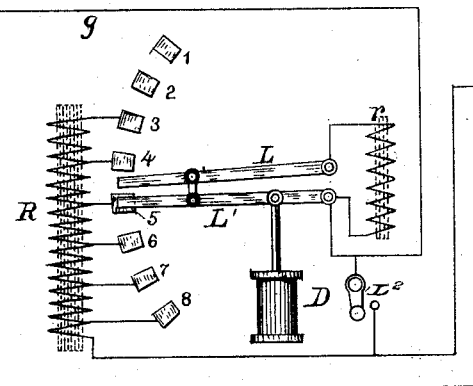
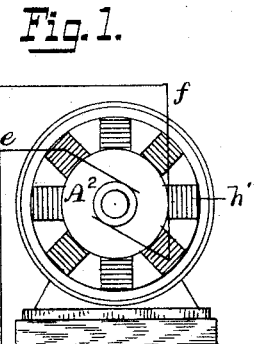
Fig. 1.
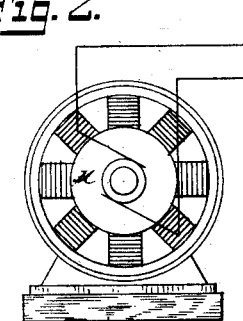
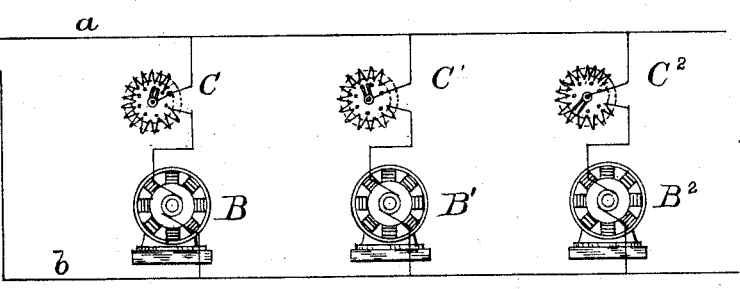
Fig. 2.
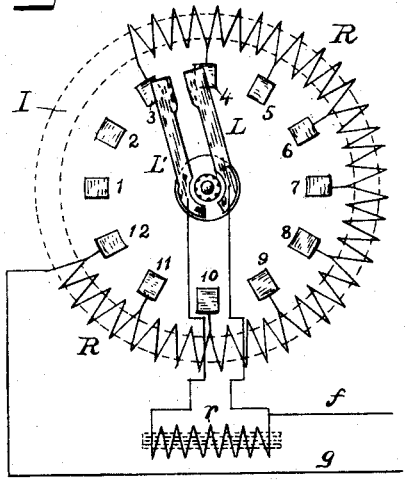
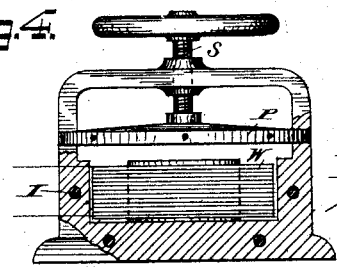
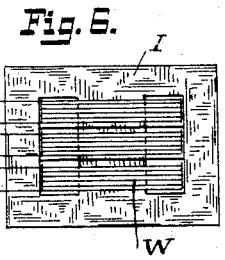
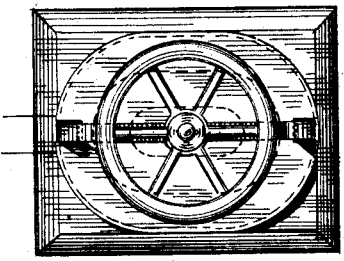
Fig. 3. Fig. 4. Fig. 6. Fig. 5.
Witnesses:
Oscar E. Perrigo
Ths K. Stuart
Inventor
E. Wilbur Rice Jr.
By Townsend MacArthur
Atty

UNITED STATES PATENT OFFICE.

EDWIN WILBUR RICE, JR., OF LYNN, MASSACHUSETTS.

METHOD OF SYNCHRONIZING ALTERNATE-CURRENT MACHINES.

SPECIFICATION forming part of Letters Patent No. 430,320, dated June 17, 1890.

Application filed February 4, 1888. Serial No. 262,985. (No model.)

*To all whom it may concern:*

Be it known that I, EDWIN WILBUR RICE, Jr., a citizen of the United States, and a resident of Lynn, in the county of Essex and State of Massachusetts, have invented a certain new and useful Method of Bringing Alternating-Current Machines into Synchronous Operation, of which the following is a specification.

My invention relates to a method of establishing two alternating-current machines in synchronous action upon the same circuit, and is designed specially with reference to the coupling of alternating-current generators in multiple, though my method is also applicable to the case of an alternating dynamo and an alternating-current motor when the latter is to be connected to and run by the former in the usual way, and provides a means whereby a connection and operation of the two in proper synchronous relation may be readily and easily effected.

In the commercial practice of lighting or distributing power by means of alternating currents it becomes frequently necessary, convenient, or economical to couple together in multiple two or more alternating-current generators or motors—as, for instance, when it is desired to relieve an overloaded machine—that is, a machine delivering more work than its rated capacity by giving part of its work to another machine or when the work to be done varies greatly in amount, so that a much smaller generator or motor would be sufficient for a part of the time. The same considerations apply to a number of such machines whose total capacity is not at all times needed and to motors on an alternating circuit. It is assumed that the alternating impulses of current to be combined are of similar character—that is, approximately correspond as to potential and number of alternations per second, as it is requisite that such be the case in order that a multiple connection may be made between the generators or motors.

It has been the practice, and it is the present practice, to make the multiple connection of alternating-current generators or motors after the impulses are observed to synchronize, various devices being used for determining the times of synchronism. My improved method of making such multiple connection, however, enables two or more alternating dynamos or motors, which are developing approximately the same potential difference, or running on circuits of approximately the same potential difference, respectively, to be coupled in multiple at any time without any special preliminary observation, the electrical impulses becoming synchronized automatically through the medium of the means employed in making this multiple connection.

Briefly, my invention consists in bringing the two machines to synchronism by interposing a reactive coil in the armature-circuit between the machines to be connected. The electrical activity displayed in this reactive coil depends upon the amount of current flowing through it at any time, which in turn depends upon the difference in the phases of the currents passing to the coil, and its effect is to retard or accelerate one or the other of the machines until the phases of the electrical impulses coincide or coalesce, because this is the condition of least resistance in the combined circuits. A resistance-coil as ordinarily constructed might be used; but it is not economical of energy, and is also expensive to construct, besides requiring a very large resistance with high potentials, whereas the reactive coil necessary to couple in multiple two dynamos or motors has so small a resistance that it may be neglected and the coil may be considered as acting entirely by its counter electro-motive force.

In the accompanying drawings, Figure 1 illustrates diagrammatically the manner of carrying out my invention in the case of an alternating-current dynamo or motor to be run thereby or the case of two alternating-current dynamos to be run in multiple. Fig. 2 illustrates the case of alternating-current motors run in multiple. Fig. 3 illustrates a form of variable reactive coil and switch that may be conveniently employed. Fig. 4 shows in partial vertical section, and Fig. 5 shows in plan, another kind of reactive coil or device whose counter electro-motive effects are variable. Fig. 6 illustrates another form of reactive coil.

Referring to Fig. 1, A is an alternating-current dynamo with its circuit-wires *a b c d*, as shown, and A² is another and similar dynamo or motor with its circuit-wires, one of which e is shown connected to the wire c of dynamo A, while the other wire f is shown as connected to a reactive coil R, preferably made variable and constructed after the manner shown in the other figures or in any other suitable way. Connection from the coil to dynamo A may be completed through wire g. Switch-arms L L', insulated from one another, but connected through a smaller reactive coil or resistance r and also with wire g, can be moved over a series of contact-plates 1 8, which are connected, as shown in Figs. 1 and 3, to sections of the variable reactive coil.

The dynamo A and the dynamo A² or motor A², as the case may be, may have their fields excited by any suitable source of continuous currents—such as a storage-battery, a separate dynamo developing currents constant in direction, or by commuting a part of the current developed in the dynamos A and A² or dynamo A and motor A²—as is well understood in the art. Assuming that the dynamo A is running and for any cause it is desired to divide its work with the machine A², or in case it is desired to throw on the machine A² as a motor, the method of procedure is as follows: The arms L L', which, when the machine A² is idle, are supposed to be resting on the contact-pieces 1 and 2—that is, open-circuited—are moved, so that the arm L' contacts with the contact-piece 3. In this position the working-circuit of the machine A² is closed with the circuit from the machine A through the reactive coil R, which, with the arm L' in the position just mentioned, has all its wire in circuit, and is therefore developing its maximum counter electro-motive force. The purpose of the reactive coil R is to permit a current from one machine or the other to gradually so act as to accelerate or retard the machines and to bring their phases of alternations in perfect synchronism before they are finally connected the one with the other by a conductor of comparatively no resistance or reaction. In other words, the purpose of the reactive coil R is to limit the synchronizing-current to an amount under the control of the operator, whereby that machine which is at the time feeding the circuit may not have its action interfered with by throwing on the second machine or motor or the third machine, as the case may be, even though the second or third machines are at the instant of connection non-synchronized with the impulses of the first or circuit-feeding machine.

The machine A or circuit-feeding machine may supply the current required for synchronizing, as well as feed its lights, providing that the synchronizing-current is definitely limited, and is gradually increased as the machines A and A² come into synchronous action. Thus it is the purpose of the variable reactive coil R to accomplish by enabling more or less of the counteracting resistance or electro-motive force to exist in one or both of the connecting-wires e f between the dynamos. The placing of the coil R in one such wire is generally sufficient, though it will be evident that it could be placed in both of the connecting-wires e f.

When the machines are thoroughly synchronized, the reactive coil R is entirely cut out—that is, the arms L L' are gradually moved over the contact-pieces 3 4 5 6, &c., as the machines approach synchronism, and when the arm L rests upon the contact-piece 8 the resistance R r is entirely out of circuit. However, if it is desired that one machine shall take a larger portion of the load than the other, the reactive coil R may be left in the circuit connecting the second machine. The function of the reactive coil r is to prevent sudden fluctuations of the current when the arms L L' are moved over the contacts 3 4 5 6, &c., in accordance with the principles described in a prior application for patent filed by me October 28, 1887, Serial No. 253,665.

The preferred construction of reactive coil is illustrated in Fig. 3. I is an iron core, around which is wound the wire of the reactive coil R, and the contact-pieces 1 2 3 4, &c., are arranged to be traversed by the arms L L', rotating about a center, with the supplementary resistance r interposed between the two arms, as in the former case and for a similar object. The reactive coil R may be placed at any point in the armature-circuits of two alternating dynamos or an alternating-current dynamo and motor, when, as the arms L L' are moved to the right, successive sections of the coil-winding will be cut out of circuit, thus gradually reducing the reaction or counter electro-motive force until the arms have traversed all the contact-pieces and the arm L rests on the piece 12, when all the coil is cut out of circuit and the reactive effect is *nil*.

Fig. 2 represents my invention as applied to motors on an alternating circuit. A is a source of alternating currents, and B B' B², &c., are alternating-current motors connected across the mains a b from the source A. In the circuit of each alternating-current motor is placed my synchronizing device C C' C², &c. The alternating-current motors B B' B², &c., may be brought to approximately the proper speed for the circuit on which they are to be used by any means—such, for instance, as an auxiliary motor running on the alternating circuit, or running on a current of constant direction derived from any suitable source, or by hand, or by an auxiliary winding on the motor itself. When the motor is connected with the mains supplying the alternating current by means of my improved synchronizing device, it will soon automatically adapt itself to such a speed as is suitable for the alternations of that circuit. The reactive coil may then be shunted, if desired.

Fig. 6 exhibits a preferred way of constructing the reactive coil, and represents thin sheets of soft iron, magnetically insulated from each other as far as practicable, entirely surrounding the wire coils W in such manner as to produce the maximum counter electro-motive force with a given size of coil. The terminals from the coils W may be attached to contact-plates arranged as in Fig. 3, if desired.

In the practice of my invention it is not necessary that the resistance R should have as many subdivisions as are indicated by the number of contact-pieces in the different figures of the drawings. I find that three or four divisions answer every purpose. By properly proportioning the reactive coil R so that its counter electro-motive force is just sufficient to allow the precise amount of synchronizing-current to flow the synchronism may be effected without any divisions or graduations in the coil, the coil being shunted by an ordinary shunting-switch arranged as indicated at $L^2$, Fig. 1. This construction, however, requires the coil to be carefully adjusted to each particular application, and in practice is not as good as a variable reactive coil.

Fig. 4 shows another means of varying the reactive effect of the reactive coil. In this case, instead of varying the effect by cutting in or out more or less of the coil-winding W, the magnetic resistance of the core I is decreased or increased, which practically produces the same effect. This variation is accomplished by the plate P, whose position is controlled, it may be, by a screw S. For economy of construction the iron of the reactive coil may be cast-iron, as it is in use for a very short time, and the Foucault currents induced when the coil is in operation may therefore be disregarded.

Fig. 5 is a plan view of the coil Fig. 4, in which similar letters refer to similar parts. The cast-iron surrounding the winding W should of course be slotted to such an extent as will prevent the Foucault currents from practically influencing the reactive effect of the reactive coil for the use for which it is intended.

I have herein described the reactive coil as placed in a circuit between the working-armatures of the two machines; but I do not limit myself to this precise location, since the essence of the invention consists in interposing the coil in any circuit in which the two machines would tend to establish alternating currents, to which the reactive coil could act as a counter electro-motive-force resistance in the manner described, so as to tend to accelerate one and retard the other machine.

What I claim as my invention is—

1. The herein-described improvement in methods of connecting in synchronism two alternating-current machines, consisting in interposing a counter electro-motive force or reaction in the circuit between them depending upon the difference in phases of the currents, so as to retard or accelerate one or the other of the machines until the phases of the electrical impulses coalesce or correspond.

2. The herein-described improvement in methods of connecting and effecting synchronous action between two alternating-current machines, consisting in setting up a counter electro-motive force or reaction to the flow of current in the circuit between the two machines due to difference in phase of the machines and gradually diminishing the reactive effect as the machines approach synchronism.

3. The herein-described improvement in methods of bringing two alternating-current dynamos into synchronous operation in multiple arc with one another, consisting in setting up a variable reactive effect or counter electro-motive force in the armature-connection between them, depending in amount upon the difference in phase of the two machines, so as to retard or accelerate one or the other of them until their phases coincide or coalesce.

E. WILBUR RICE, Jr.

Witnesses:
O. K. STUART,
J. W. GIBBONEY.